(12) United States Patent
Zhao et al.

(10) Patent No.: US 7,045,477 B2
(45) Date of Patent: May 16, 2006

(54) PROCESS FOR CONTINUOUSLY REGENERATING CATALYST PARTICLES

(75) Inventors: Rendian Zhao, Beijing (CN); Zhihai Zhao, Beijing (CN); Jin Wang, Beijing (CN); Lanxin Zhang, Beijing (CN); Feng Shi, Beijing (CN); Jinhui Fu, Beijing (CN)

(73) Assignees: China Petrochemical Corporation, (CN); Research Institute of Petroleum Processing, Sinopec, (CN)

( * ) Notice: Subject to any disclaimer, the term of this patent is extended or adjusted under 35 U.S.C. 154(b) by 961 days.

(21) Appl. No.: 09/837,788

(22) Filed: Apr. 18, 2001

(65) Prior Publication Data

US 2001/0049328 A1   Dec. 6, 2001

(30) Foreign Application Priority Data

Apr. 18, 2000   (CN) .............................. 00 1 05687

(51) Int. Cl.
*B01J 20/34* (2006.01)
*B01J 38/12* (2006.01)
*B01J 38/42* (2006.01)

(52) U.S. Cl. .......................... 502/38; 502/35; 502/37; 502/50

(58) Field of Classification Search ................ 502/38, 502/35, 37, 50
See application file for complete search history.

(56) References Cited

U.S. PATENT DOCUMENTS

| | | | |
|---|---|---|---|
| 3,692,496 A | 9/1972 | Greenwood et al. | 23/288 |
| 3,725,249 A | 4/1973 | Vesely et al. | 208/139 |
| 3,761,390 A | 9/1973 | Greenwood et al. | 208/65 |
| 3,838,038 A | 9/1974 | Greenwood et al. | 208/108 |
| 4,133,743 A * | 1/1979 | Boret et al. | 208/64 |
| 4,148,749 A * | 4/1979 | Ab der Halden et al. | 252/415 |
| 4,218,338 A * | 8/1980 | Huin et al. | 252/415 |
| 4,578,370 A | 3/1986 | Greenwood | 502/37 |
| 4,859,643 A | 8/1989 | Sechrist et al. | 502/37 |
| 4,880,604 A | 11/1989 | Koves | 422/220 |
| 4,977,119 A | 12/1990 | Koves | 502/48 |
| 5,034,117 A * | 7/1991 | De Bonneville et al. | 208/14 |
| 5,277,880 A | 1/1994 | Sechrist et al. | 422/216 |
| 5,776,849 A * | 7/1998 | Fung et al. | 502/37 |
| 6,048,814 A * | 4/2000 | Capelle et al. | 502/37 |
| 6,103,652 A * | 8/2000 | Brunet et al. | 502/37 |
| 6,133,183 A * | 10/2000 | Capelle et al. | 502/37 |
| 6,147,022 A * | 11/2000 | Brunet et al. | 502/45 |

* cited by examiner

*Primary Examiner*—Stuart Hendrickson
(74) *Attorney, Agent, or Firm*—Scully, Scott, Murphy & Presser

(57) ABSTRACT

A process for continuously regenerating catalyst particles comprising: passing deactivated catalyst particles downwards in sequence through the first coke-burning zone, second coke-burning zone, oxychlorination zone, and calcination zone in the regenerator, wherein the catalyst particles are contacted with the regeneration gas from the second coke-burning zone, the supplemented dry air, and an inert gas in the first coke-burning zone; introducing an oxygen-containing regeneration gas from the second coke-burning zone into the regenerator, wherein said gas is contacted with the catalyst particles from the first coke burning zone; withdrawing the regeneration gas from the regenerator through the first coke-burning zone and, after the recovery system, recycling it to the second coke-burning zone. The regeneration gas may pass the catalyst bed in either a centrifugal or centripetal way. This process prevents the regeneration gas with a high water content from contacting the catalyst at a high temperature as in the conventional continuous coke-burning processes for regenerating catalyst particles and thereby reduces the decreasing rate of the specific surface area of the catalyst and prolongs its service life.

13 Claims, 7 Drawing Sheets

PROCESS FOR CONTINUOUSLY REGENERATING CATALYST PARTICLES

BACKGROUND OF THE INVENTION

The present invention relates to a process for regenerating a catalyst used in hydrocarbon conversion, more particularly, it relates to a process for continuously regenerating catalyst particles.

Catalytic reforming is an important technology or producing high octane gasoline and aromatics, and by-product hydrogen, wherein the reactions taking place include dehydrogenation, dehydrocyclization, isomerization, cracking and coking, etc, The coke formed by coking deposits on the surface of the catalyst and causes it to deactivate, so there is a need to regenerate the catalyst and restore its activity through regeneration. Regeneration generally includes coke-burning, oxychlorination, calcination and reduction. Coke-burning is to burn off the coke deposited on the catalyst and carry away the heat generated in burning with an oxygen-containing gas. Oxychlorination is to complement the chlorine component lost from the catalyst and oxidize the active metal components and uniformly distribute them on the surface of the catalyst support. Calcination is to remove water contained in the catalyst. Reduction is to reduce active metal components in oxidized states in a hydrogen atmosphere.

Currently, a radial bed is adopted in the main-body configuration of the coke-burning zone of a continuous reforming regenerator in industry, wherein the catalyst particles slowly move downwards in the annular bed by means of gravity, and an oxygen-containing regeneration gas passes the catalyst bed along the radial direction, thereby realizing the continuous coke-burning.

The service life of the reforming catalyst mainly depends on the decreasing rate of its specific surface area and the major factors that affect the decreasing rate of the specific surface area arc the moisture of the regeneration gas, the regeneration temperature, and the residence time of the catalyst within the high temperature zone. It has been pointed out by O. Clause et al in "Continuing Innovation in Cat Reforming (1998 NPRA, AM-98-39) that the loss of the specific surface area of the catalyst reduces along with the decrease of water content in the regeneration gas. The trace amount of oil vapor adsorbed by the carbon-containing deactivated catalyst from the reaction system and the coke deposited on the catalyst will generate a great amount of steam during burning reaction, thereby resulting in a relatively high content of water in the regeneration gas, Besides, an environment of high temperature and high moisture will exert an adverse effect on the physical properties of the catalyst because coke-burning is carried out at a high temperature, thus causing a loss of the specific surfaces area of the catalyst and the agglomeration of platinum particles and affecting the activity of the catalyst. In the meanwhile, the presence of a large amount of steam will speed up the loss of the acidic component, chlorine, from the catalyst.

For a radial coke-burning bed, at the inlet of the bed when the catalyst having a high carbon content contacts the oxygen-containing regeneration gas transversely passing the catalyst bed, a great amount of heat is released from coke-burning. Such heat congregates gradually towards the inner screen and causes the temperature at the upper part of the bed to rise, while the temperature at the lower part of the bed rises slightly because the content of carbon in the catalyst is low and less heat is released. Therefore, the radial bed has the disadvantage of the irrationality of the temperature distribution throughout the whole bed. The high temperature zone in the upper part of the bed will exert an adverse effect on the catalyst performance, while the temperature at the lower part is relatively low and there is a potential to further enhance the capacity of coke-burning. Consequently, proper adjustment of the temperature distribution within the bed will have a positive effect on protecting the catalyst performance and prolonging its service life.

The early form of the coke-burning zone of a continuous reforming regenerator is a strip-shape one. For example, in the technologies provided in U.S. Pat. No. 3,692,496, U.S. Pat. No. 3,725,249, U.S. Pat. No. 3,761,390, and U.S. Pat. No. 3,838,038, the catalyst particles slowly move downwards within a strip-form space by means of gravity, and the regeneration gas is introduced from one side and withdrawn from the other side. After passing through an caustic scrubbing unit and a regeneration gas blower, the regeneration gas returns to the coke-burning zone of the regenerator for recycle use. Oxygen required for coke-burning is supplemented partially by the oxygen-containing gas from the oxychlorination zone. Since there is no drying system in the recycle loop of the regeneration gas of the above patents, the water content in the regeneration gas is relatively high, thereby affecting the service life of the catalyst.

In the thermal regeneration technology provided in U.S. Pat. No. 4,578,370, the coke-burning zone in the regenerator is a section of radial bed configuration and the catalyst particles slowly move downwards in an annular space by means of gravity. The gas space between the outer screen of the coke-burning zone and the inner wall of the regenerator is divided into two parts. After collected in the central pipe, the regeneration gas is withdrawn from the regenerator, a small portion of which is vented and the remainder passes through a regeneration gas blower and is divided into two parts. One part enters the upper coke-burning section via an air cooler and a heater, and the other part directly enters the lower coke-burning section. Since no drying system is provided in the recycle loop of the regeneration gas, the water content in the regeneration gas is adjusted by supplementing air and venting regeneration gas to finally reach a balanced value. The content of water in the regeneration gas is always maintained at a relatively high level, thus exerts an adverse effect on the catalyst performance.

In the regeneration technology provided in U.S. Pat. No. 4,859,643 and U.S. Pat. No. 5,277,890, the coke-burning zone of the regenerator has a tapered configuration. The bed has different thickness at different axial positions. This can improve the gas distribution along the axial position. The upper part of the bed is thinner and the amount of distributed gas is greater, while the lower part of the bed is thicker and the amount of distributed gas is less, thus better satisfying the requirement for oxygen at different axial positions and reducing the residence time of the catalyst in the high temperature zone in the upper part of the bed. However, since no drying system is provided in the recycle loop of the regeneration gas, the content of water in the regeneration gas is relatively high.

In the thermal regenerating technology provided in U.S. Pat. No. 4,880,604 and U.S. Pat. No. 4,977,119, the coke-burning zone of the regenerator has a strip-shape configuration. The catalyst particles slowly move downwards within the strip-shaped space by means of gravity. The upper part and the lower part of the outer screen have different perforation rates, thereby permitting different distributions of the regeneration gas along the axial direction, so that a greater amount of the gas is distributed to the upper part, while less amount of the gas is distributed to the lower part, so it is beneficial to meeting the needs for oxygen in different axial positions. However, since no drying system is provided in the recycle loop of the regeneration gas, the content of water in the regeneration gas is relatively high.

In most of the technologies introduced in the above patents, the contents of water in the recycled regeneration gases are all relatively high and the coke-burning for regenerating the catalyst particles is carried out in an environment of high temperature and high water content. Such an environment is easy to cause a loss of the specific surface area of the catalyst, thereby shortening its service life. Moreover, there commonly exists the problem of high temperatures at the inner screen of the upper part of the radial bed, Although U.S. Pat. No. 4,859,643, U.S. Pat. No. 5,277,880, U.S. Pat. No. 4,880,604, and U.S. Pat. No. 4,977,119 propose a bed configuration having a tapered configuration and different perforation rates and thereby increase the amount of oxygen required in the upper part of the bed, but consequently the temperature near the inner screen in the upper part of the bed is raised and therefore the problem of the irrationality of the temperature distribution in the radial bed has not yet been solved.

In the dry regeneration technology provided in U.S. Pat. No. 5,034,177, the catalyst bed in the coke-burning zone is divided into two sections which are same in the configuration and size but somewhat different in the conditions at the inlets, namely the inlet temperature of the regeneration gas in the second section of the bed is higher than that in the first section of the bed and air is supplemented via the space between the two sections to maintain the oxygen content at a level as required in each section respectively. After passing through the first and second coke-burning sections in sequence, the regeneration gas is withdrawn from the regenerator and mixed with the outlet gas from the oxychlorination zone. Said regeneration gas is then introduced into the scrubbing and drying system and sent back to the first coke-burning section of the regenerator through the recycling compressor. Although the water content in the recycled regeneration gas entering the regenerator is relatively low because of the drying system provided in the recycle loop of the regeneration gas, the catalyst is still in an environment of high temperature and high water content because when the regeneration gas enters the second coke-burning section directly from the first coke-burning section, the steam generated in the first coke-burning section in the upper part by the burning reaction of the small amount of hydrocarbons and hydrogen in coke carried by the deactivated catalyst also enters the second coke-burning section. Such an environment may result in a rapid decrease in the specific surface area of the catalyst and affect its service life.

In summary, there are mainly two types of coke-burning zones in the regenerators of the prior arts. One is a two-sectioned radial bed with a drying system provided in the loop of the recycled regeneration gas, and the other is a one-sectioned radial bed without a drying system in the loop of the recycled regeneration gas. In the former, the steam generated by the coke-burning in the upper part of the bed entirely enters the lower coke-burning section, resulting in that the final coke-burning is completed in an environment with high water content. In the latter, the water content in the regeneration gas is even higher and the temperature near the inner screen in the upper part of the bed is relatively high, so the coke-burning is completed in an environment of high temperature and high water content. As a result, both of the above types of coke-burning have the problem that the catalyst is in an environment of high temperature and high water content, which affects the service life of the catalyst.

The object of the present invention is to provide a process for continuously regenerating catalyst particles under an environment of lower temperature and lower water content compared with the prior arts.

BRIEF DESCRIPTION OF THE INVENTION

The process provided by the present invention comprises: passing carbon-containing deactivated catalyst particles from moving-bed reactors downwards in sequence through the first coke-burning zone, second coke-burning zone, oxychlorination zone, and calcination zone in the regenerator, wherein the deactivated catalyst particles are contacted, in the first coke-burning zone, with the regeneration gas from the second coke-burning zone, the supplemented dry air and an inert gas; after coke-burning in the first coke-burning zone, withdrawing said regeneration gas from the regenerator via the first coke-burning zone; and after the recovery system, sending it back to the second coke-burning zone, where it is contacted with the catalyst particles from the first coke-burning zone. Said recovery system includes a drying step.

A preferred process for continuously regenerating catalyst particles according to the present invention comprises: passing deactivated catalyst particles from moving-bed reactors downwards in sequence through the first coke-burning zone, second coke-burning zone, oxychlorination zone, and calcination zone in the regenerator by means of gravity; introducing a dry oxygen-containing regeneration gas via the bottom of the second coke-burning zone at an inlet temperature of 480–520° C., and passing it through the catalyst bed of the second coke-burning zone along the radial direction in a centrifugal or centripetal way to burn off the small amount of coke remaining on the catalyst particles; cooling said regeneration gas from the catalyst bed of the second coke-burning zone to 410–480° C. by adding a dry air for supplementing oxygen and a dry inert gas; and subsequently introducing said regeneration gas into the first coke-burning zone and passing it through the catalyst bed of the first coke-burning zone along the radial direction in a centrifugal or centripetal way to burn off most coke on the catalyst particles; withdrawing the regeneration gas from the regenerator, mixing it with the outlet gas from the oxychlorination zone, and passing it then into the recovery system including drying step and then into the compressor; heating the compressed dry regeneration gas to a temperature of 480–520° C. and sending it back to the second coke-burning zone, thus forming a recycle loop, wherein the oxygen content of the regeneration gas at the inlet of each coke-burning zone is 0.2–1.0 v %; the water content of the regeneration gas entering the second coke-burning zone is 10–200 ppmv; and the operating pressure in the regenerator is 0.3–0.9 MPa (absolute).

DETAILED DESCRIPTION OF THE INVENTION

Figure 1:
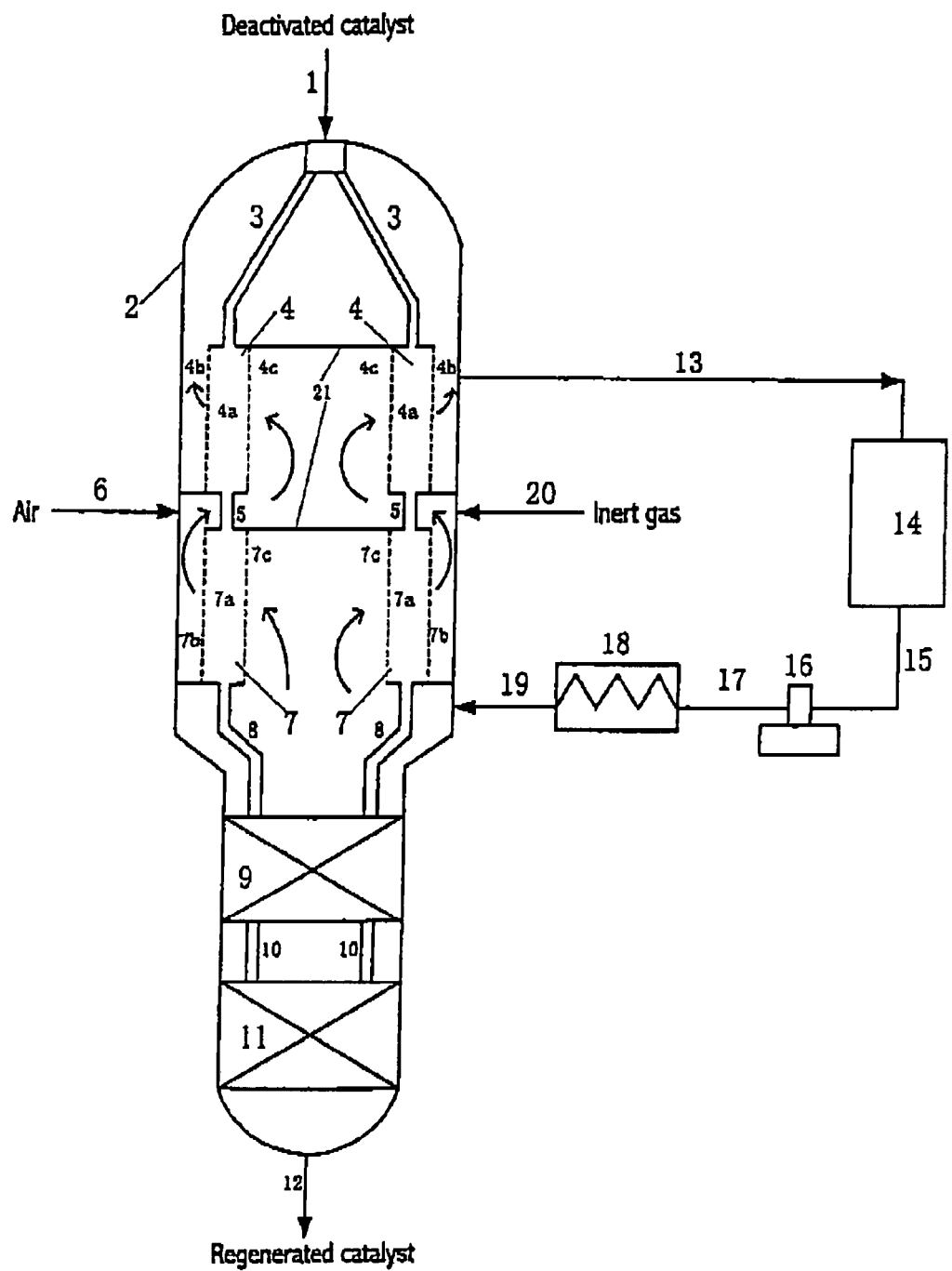
FIGS. 1–4 are the schematic flow diagrams of the first to fourth embodiments of the process provided by the present invention respectively.

The regenerator comprises from top to bottom a first coke-burning zone, second coke-burning zone, oxychlorination zone, and calcination zone in sequence.

Deactivated catalyst particles from moving-bed reactors enter the regenerator, and move slowly downwards by means of gravity within the annular space of the first coke-burning zone, where they are contacted with the regeneration gas from the second coke-burning zone, the supplemented dry air and an inert gas, and subsequently the deactivated catalyst particles from which most of the coke is burnt off enter the second coke-burning zone and come into contact with the dry regeneration gas, and then the catalyst particles from which the small amount of remaining coke is burnt off pass in sequence through the oxychlorination zone for dispersing the metallic components and supplementing chlorine, and the calcination zone for drying the catalyst, and thereafter leave the regenerator, wherein said recovery system includes a drying step.

A dry oxygen-containing regeneration gas is introduced via the bottom of the second coke-burning zone at an inlet temperature in the range of 480–520° C. and passed through the catalyst bed of the second coke-burning zone along the radial direction in a centrifugal or centripetal way to burn off the small amount of remaining coke on the catalyst particles. The regeneration gas from the catalyst bed of the second coke-burning zone is cooled down to a temperature of 410–480° C. by adding a dry air for supplementing oxygen and a dry inert gas, and then is introduced into the first coke-burning zone and passed through the catalyst bed of the first coke-burning zone along the radial direction in a centrifugal or centripetal way to burn off most of the coke on the catalyst particles. Said regeneration gas is then withdrawn from the regenerator, mixed with the outlet gas from the oxychlorination zone, passed through a recovery system including drying step and enters a compressor, and then the compressed dry regeneration gas is heated to a temperature of 480–520° C. and sent back to the second coke-burning zone, thus forming a recycle loop, wherein the oxygen content of the regeneration gas at the inlet of each coke-burning zone is 0.2–1.0 v %; the water content of the regeneration gas entering the second coke-burning zone is 10–200 ppmv; and the operating pressure in the regenerator is 0.3–0.9 MPa (absolute).

Said inner screen in the first coke-burning zone may be a cylinder in shape with either a uniform diameter or varied diameters. When the inner screen in the first coke-burning zone is a cylinder with varied diameters, the diameter of the outer screen does not change with the height, while the diameter of the inner screen may taperingly decease linearly from top to bottom, with the minimal diameter being 60–90% of the maximal diameter; the diameter of the inner screen nay also decrease in a straight down manner from the point at 40–60% of the height of the first coke-burning zone from top to bottom, with the bottom diameter being 60–90% of the top diameter. Said inner screen of the second coke-burning zone is a cylinder with a uniform diameter. The thickness of the bed in the first coke-burning zone changes along the axial position, thereby the gas passing through the upper bed is more than that passing through the lower bed, so as to advantageously meet the need of the catalyst having a high carbon content in the upper bed for oxygen.

Said dry air comes from a separate air compressing system, and the dry inert gas may come from either outside sources or the loop of the regeneration gas.

Said catalysts applied in the present invention call be any type of catalysts for hydrocarbon conversion, especially the catalysts suitable for continuous catalytic reforming or bi- (or multi)-metal catalysts containing other promoters.

Coke-burning of the deactivated catalyst particles may be carried out either in the first annular coke-burning zone and the second annular coke-burning zone, or in the first annular coke-burning zone with varied bed thickness and the second annular coke-burning zone. Each case has at least four embodiments.

The coke-burning of the deactivated catalyst particles in the first annular coke-burning zone and the second annular coke-burning zone is taken as an example, to specifically illustrate each embodiment of the process according to the present invention as follows.

EMBODIMENT 1

Deactivated catalyst particles from the reactor enter the first coke-burning zone of the regenerator from the top downwards and come into contact with the oxygen-containing regeneration gas from the second coke-burning zone, the supplemented dry air and an alert gas; the deactivated catalyst particles from which most of the coke is burnt of enter the second coke-burning zone and come into contact with the dry oxygen-containing gas from the recycle loop; the deactivated catalyst particles from which the small amount of remaining coke is burnt off pass in sequence through the oxychlorination zone for dispersing the metallic components and chlorine supplementation and the calcination zone for drying the catalyst, and then leave the regenerator. The flow direction of the regeneration gas in the coke-burning zones is as follows: The recycled regeneration gas enters the space formed by the inner screen of the second coke-burning zone from its bottom; passing in sequence through the inner screen, radial bed and outer screen of the second coke-burning zone, said regeneration gas enters the space formed by the inner screen of the first coke-burning zone; after passing in sequence through the inner screen, radial bed and outer screen of the first coke-burning zone, said regeneration gas leaves the regenerator; and afterwards the dry and compressed regeneration gas is recycled back to the bottom of the second coke-burning zone.

EMBODIMENT 2

Deactivated catalyst particles enter the first coke-burning zone of the regenerator from the top downwards and come into contact with the oxygen-containing regeneration gas from the second coke-burning zone, the supplemented dry air and an inert gas; the deactivated catalyst particles from which most of the coke is burnt off enter the second coke-burning zone and come into contact with the dry oxygen-containing regeneration gas from the recycle loop; the deactivated catalyst particles from which the small amount of remaining coke is burnt off pass in sequence through the oxychlorination zone for chlorine supplementation and the calcination zone for drying the catalyst, and then leave the regenerator. The flow direction of the regeneration gas in the coke-burning zones is as follows: The recycled regeneration gas via the bottom of the second coke-burning zone passes in sequence through the outer screen, radial bed and inner screen, and enters the space formed by the inner screen of the second coke-burning zone and then enters the space formed by the inner screen of the first coke-burning zone; after passing in sequence through the inner screen, radial bed and outer screen of the first coke-burning zone, said regeneration gas leaves the regenerator; and afterwards the dry and compressed regeneration gas is recycled back to the bottom of the second coke-burning zone.

EMBODIMENT 3

Deactivated catalyst particles enter the first coke-burning zone of the regenerator from the top downwards and come into contact with the oxygen-containing regeneration gas from the second coke-burning zone, the supplemented dry air and an inert gas; the deactivated catalyst particles from which most of the coke is burnt off enter the second coke-burning zone and come into contact with the dry oxygen-containing regeneration gas from the recycle loop; the deactivated catalyst particles from which the small amount of remaining coke is burnt off pass in sequence through the oxychlorination zone for chlorine supplementation and the calcination zone for drying the catalyst, and then leave the regenerator. The flow direction of the regeneration gas in the coke-burning zones is as follows: The recycled regeneration gas via the bottom of the second coke-burning zone, passes in sequence through the outer screen, radial bed, and inner screen, and enters the space formed by the inner screen of the second coke-burning zone; and then said regeneration gas enters the annular space formed between the outer screen of the first coke-burning zone and the inner wall of the regenerator, passes in sequence through the outer screen, radial bed and inner screen of the first coke-burning zone and then leaves the regenerator; and afterwards the dry and compressed regeneration gas is recycled to the bottom of the second coke-burning zone.

EMBODIMENT 4

Deactivated catalyst particles enter the first coke-burning zone of the regenerator from the top downwards and come into contact with the oxygen-containing regeneration gas from the second coke-burning zone, the supplemented dry air and an inert gas; the deactivated catalyst particles from which most of the coke is burnt off enter the second coke-burning zone and come into contact with the dry oxygen-containing regeneration gas from the recycle loop; the deactivated catalyst particles from which the small amount of remaining coke is burnt off pass in sequence through the oxychlorination zone for chlorine supplementation and the calcination zone for drying the catalyst, and then leave the regenerator. The flow direction of the regeneration gas in the coke-burning zones is as follows: The recycled regeneration gas via the bottom of the second coke-burning zone enters the space formed by its inner screen, passes in sequence through the inner screen, radial bed, and outer screen therein, and enters the annular space formed between the outer screen of the first coke-burning zone and the inner wall of the regenerator; then said regeneration gas passes in sequence through the outer screen, radial bed and inner screen of the first coke-burning zone, and leaves the regenerator; and afterwards the dry and compressed according to regeneration gas is recycled to the bottom of the second coke-burning zone.

The process provided by the present invention will be particularly described on the basis of the drawings, but the process provided by the present invention is not limited to the following embodiments. Also, the form and the size of the apparatus and pipes are not limited by the drawings, but are determined according to the particular situations.

Figure 3:
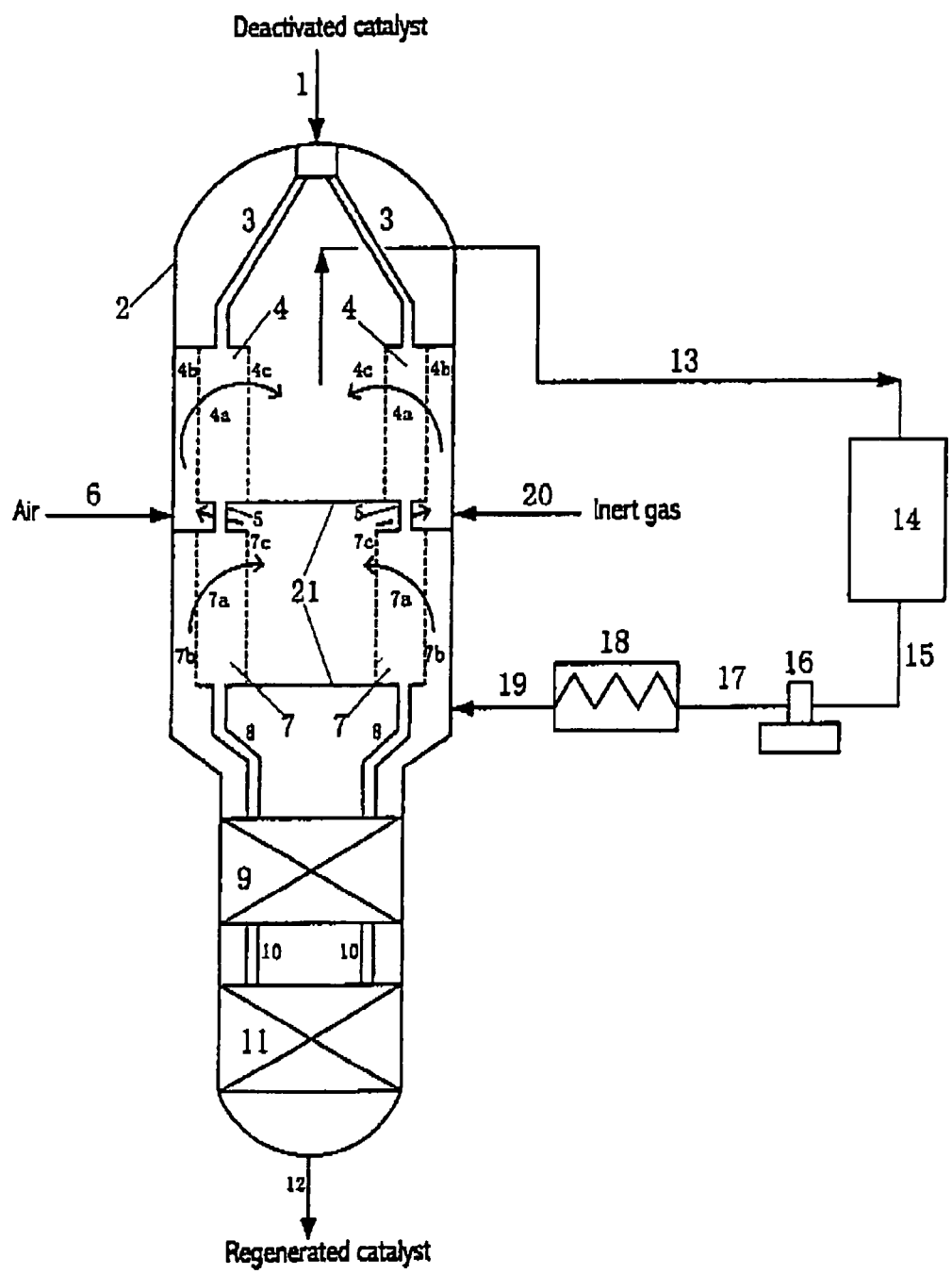
Figure 4:
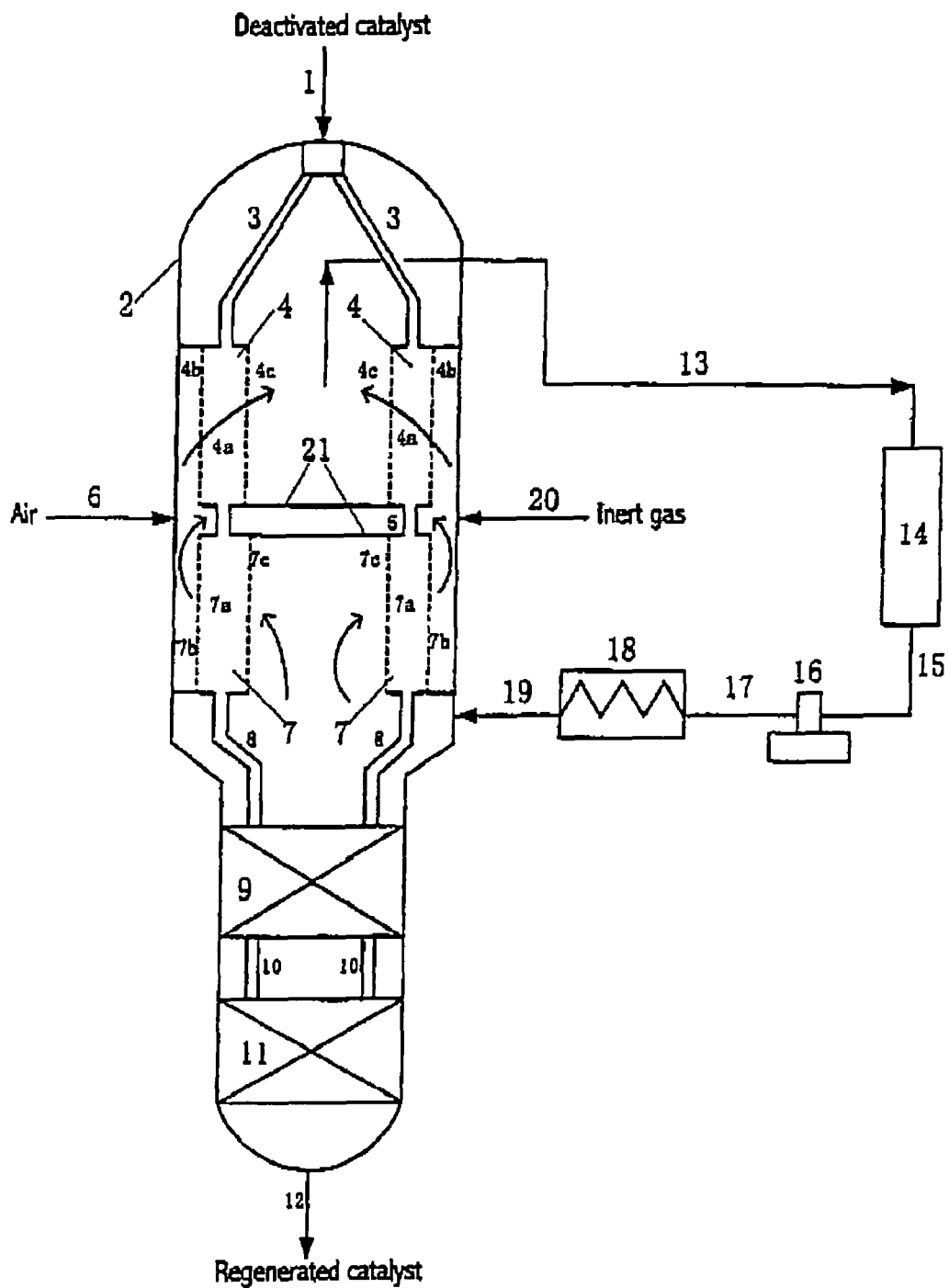
Figure 5:
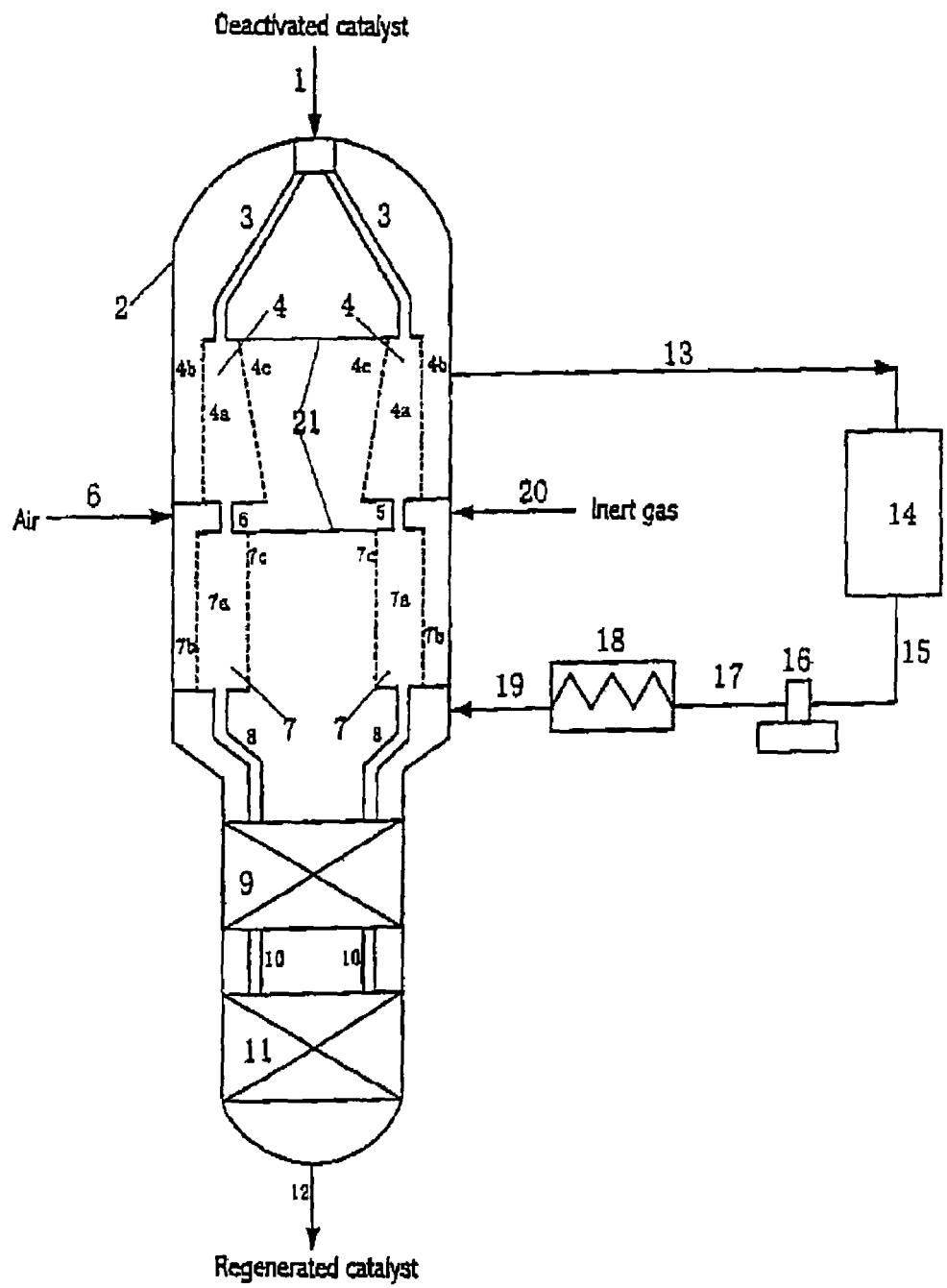
FIGS. 5 and 6 are the schematic flow diagrams when the process provided by the present invention is carried out in a regenerator comprising a first coke-burning zone with varying thickness of catalyst bed.
Figure 6:
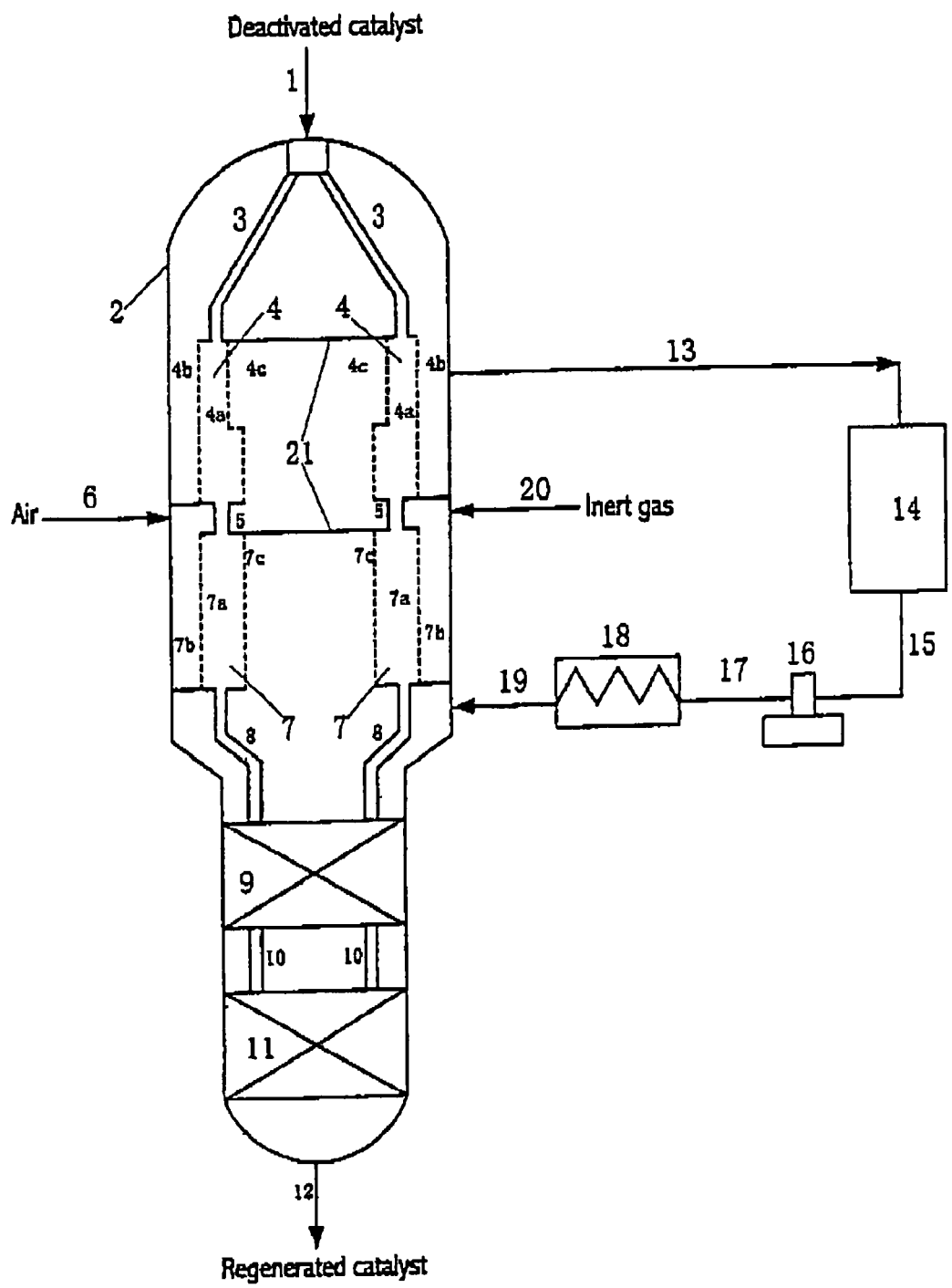

FIGS. 1–4 are respectively the schematic flow diagrams of the first to the fourth embodiments of the process provided by the present invention showing that the coke-burning is conducted in an annular first coke-burning zone and an annular second coke-burning zone; and FIGS. 5 and 6 are the schematic flow diagrams of the process provided by the present invention showing that the coke-burning is conducted in a regenerator comprising a first coke-burning zone with varied bed thickness.

Coke-burning of the deactivated catalyst particles can be conducted in the annular first coke-burning zone and second coke-burning zone.

As shown in FIG. 1, the flow diagram of the first embodiment is as follows;

Deactivated catalyst particles enter regenerator 2 through line 1, and then enter bed 4a of the annular first coke-burning zone 4 through a plurality of diplegs 3 and are contacted with the regeneration gas from the second coke-burning zone 7, the dry air from line 6 and a dry inert gas from line 20. After most of the coke deposited thereon is burnt off, said catalyst particles move slowly downwards by means of gravity, enter bed 7a of the second coke-burning zone 7 through diplegs 5, and are contacted with the recycled regeneration gas from line 19. After the remaining coke deposited thereon is burnt off, said catalyst particles enter the oxychlorination zone 9 (the chlorine-containing gas is not indicated in the Figure) through diplegs 8. After oxychlorination, said catalyst particles enter the calcination zone 11 through diplegs 10 for drying the catalyst (the oxygen-containing gas is not indicated in the Figure). Then the regenerated catalyst particles leave the regenerator 2 through line 12.

The recycled regeneration gas enters the space formed by the inner screen 7c of the second coke-burning zone 7 from its bottom through line 19, then passes through the inner screen 7c and enters the radial catalyst bed 7a to come into contact with the catalyst particles carrying a small amount of coke. Said regeneration gas passes through the outer screen 7b and then enters the space formed by the inner screen 4c of the first coke-burning zone 4. Then said regeneration gas passes through the inner screen 4c and enters the radial catalyst bed 4a to come into contact with the deactivated catalyst particles. Said regeneration gas then passes through the outer screen 4b, leaves regenerator 2 and enters the recovery system 14 through line 13. Subsequently, the dry gas enters the compressor 16 through line 15 and the compressed gas after being heated by heater 18 is recycled to the bottom of the second coke-burning zone 7 through line 19.

Figure 2:
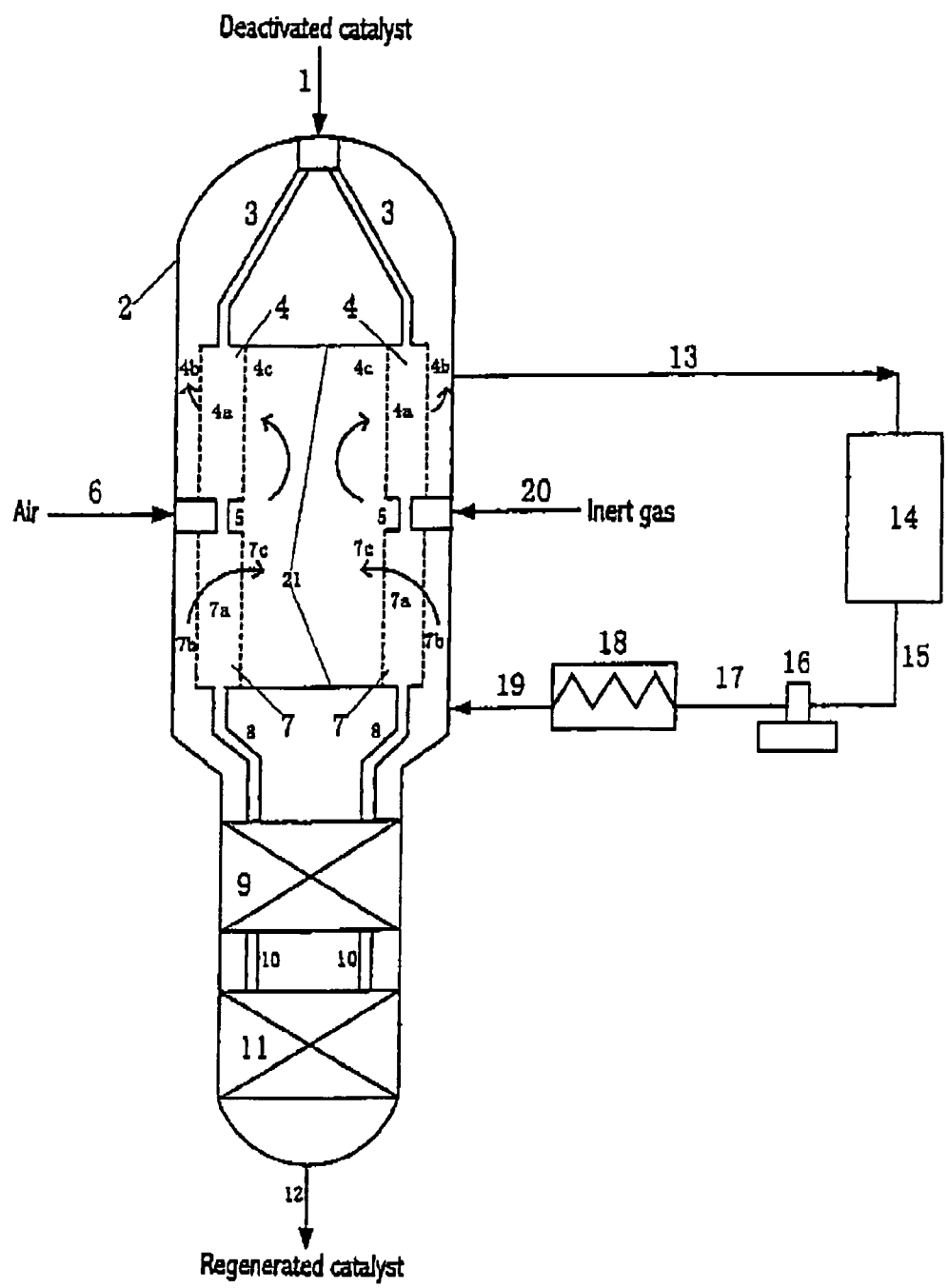

As shown in FIG. 2, the flow diagram of the second embodiment is as follows:

Deactivated catalyst particles enter regenerator 2 through line 1, and then enter bed 4a of the annular first coke-burning zone 4 through a plurality of diplegs 3 and come into contact with the regeneration gas from the second coke-burning zone 7, the dry air from line 6 and a dry inert gas from line 20. After most of the coke deposited thereon is burnt off, said catalyst particles move slowly downwards by means of gravity, enter bed 7a of the second coke-burning zone 7 through diplegs 5, and come into contact with the recycled regeneration gas from line 19. After the remaining coke deposited thereon is burnt off, said catalyst particles enter the oxychlorination zone 9 (the chlorine-containing gas is not indicated in the Figure) through diplegs 8. After oxychlorination, said catalyst particles enter the calcination zone 11 through diplegs 10 for drying the catalyst (the oxygen-containing gas is not indicated in the Figure). Then, the regenerated catalyst particles leave regenerator 2 through line 12.

The recycled regeneration gas enters the regenerator 2 from the bottom of the second coke-burning zone 7 through line 19, then passes through the outer screen 7b and enters the radial bed 7a, and comes into contact with the catalyst particles carrying a small amount of coke. Said regeneration gas then passes through the inner screen 7c and enters the space formed by the inner screen 7c of the second coke-burning zone 7 and then enters the space formed by the inner screen 4c of the first coke-burning zone 4. Then, it passes through the inner screen 4c of the first coke-burning zone 4 and enters the radial catalyst bed 4a, and comes into contact with the deactivated catalyst particles. Said regeneration gas then passes through the outer screen 4b and leaves regenerator 2, and then enters the recovery system 14 through line 13. The dry gas enters the compressor 16 trough line 15. The compressed gas after being heated by heater 18 is recycled to the bottom of second coke-burning zone 7 through line 19.

As shown in FIG. 3, the flow diagram of the third embodiment is as follows:

Deactivated catalyst particles enter regenerator 2 through line 1, and then enter bed 4a of the annular first coke-burning zone 4 through a plurality of diplegs 3 and come into contact with the regeneration gas from the second coke-burning zone 7, the dry air from line 6 and a dry inert gas from line 20. After most of the coke deposited thereon is burnt off, said catalyst particles move slowly downwards by means of gravity, enter bed 7a of the second coke-burning zone 7 through diplegs 5, and come into contact with the recycled regeneration gas from line 19. After the remaining coke thereon is burnt off, said catalyst particles enter the oxychlorination zone 9 (the chlorine-containing gas is not indicated in the Figure) through diplegs 8. After oxychlorination, said catalyst particles enter the calcination zone 11 through diplegs 10 for drying the catalyst (the oxygen-containing gas is not indicated in the Figure). The regenerated catalyst particles leave regenerator 2 through line 12.

The recycled regeneration gas enters the regenerator 2 from the bottom of the second coke-burning zone 7 through line 19, then passes through the outer screen 7b and enters the radial bed 7a, and comes into contact with the catalyst particles carrying a small amount of coke. Said regeneration gas then passes through the inner screen 7c and enters in sequence the space formed by the inner screen 7c of the second coke-burning zone 7 and then enters the annular space formed by the outer screen 4b of the first coke-burning zone 4 and the inner wall of the regenerator. Said regeneration gas then passes through the outer screen 4b of the first coke-burning zone 4 and enters the radial catalyst bed 4a, and comes into contact with the deactivated catalyst particles. Said regeneration gas then passes through the inner screen 4c and leaves regenerator 2 from the space formed by the inner screen 4c of the first coke-burning zone 4, and enters the recovery system 14 through line 13. The dry gas enters the compressor 16 through line 15. The compressed gas after being heated by heater 18 is recycled to the bottom of the second coke-burning zone 7 through line 19.

As shown in FIG. 4, the flow diagram of the fourth embodiment is as follows:

Deactivated catalyst particles enter regenerator 2 through line 1, and then enter bed 4a of the annular first coke-burning zone 4 through a plurality of diplegs 3 and come into contact with the regeneration gas from the second coke-burning zone 7, the dry air from line 6 and a dry inert gas from line 20. After most of the coke deposited thereon is burnt off, said catalyst particles move slowly downwards by means of gravity, enter bed 7a of the second coke-burning zone 7 through diplegs 5, and come into contact with the recycled regeneration gas from line 19. After the remaining coke thereon is burnt off, said catalyst particles enter the oxychlorination zone 9 (the chlorine-containing gas is not indicated in the Figure) through diplegs 8. After oxychlorination, said catalyst particles enter the calcination zone 11 through diplegs 10 for drying the catalyst (the oxygen-containing gas is not indicated in the Figure). The regenerated catalyst particles leave regenerator 2 through line 12.

The recycled regeneration gas enters the space formed by the inner screen 7c of the second coke-burning zone 7 from the bottom of the second coke-burning zone 7 through line 19, then passes through the inner screen 7c and enters the radial bed 7a, and comes into contact with the catalyst particles carrying a small amount of coke. Said regeneration gas then passes through the outer screen 7b and then enters the annular space formed between the outer screen 4b of the first coke-burning zone 4 and the inner wall of the regenerator. Said regeneration gas passes through the outer screen 4b of the first coke-burning zone 4 and enters the radial catalyst bed 4a, and comes into contact with the deactivated catalyst particles. Then, said regeneration gas passes through the inner screen 4c and leaves regenerator 2 from the space formed by the inner screen 4c of the first coke-burning zone 4, and enters the recovery system 14 through line 13. The dry gas enters the compressor 16 through line 15. The compressed gas after being heated by heater 18 is recycled to the bottom of the second coke-burning zone 7 through line 19.

The diameter of the inner screen of the first coke-burning zone shown in FIG. 5 reduces linearly from the top downwards. The diameter of the inner screen of the first coke-burning zone shown in FIG. 6 reduces from the top downwards starting from the point at 40–60% of the height of the first coke-burning zone. Similar to the coke-burning in the annular first coke-burning zone with a uniform diameter, these two kinds of configurations also have four embodiments respectively, of which the basic flow diagram is as follows:

Deactivated catalyst particles enter regenerator 2 through line 1, and then enter bed 4a of the annular first coke-burning zone 4 with varied bed thickness through a plurality of diplegs 3 and come into contact with the regeneration gas from the second coke-burning zone 7, the dry air from line 6 and a dry inert gas from line 20. After most of the coke deposited thereon is burnt off, said catalyst particles move slowly downwards by means of gravity, enter bed 7a of the second coke-burning zone 7 through diplegs 5, and come into contact with the recycled regeneration gas from line 19. After the remaining coke thereon is burnt off, said catalyst particles enter the oxychlorination zone 9 (the chlorine-containing gas is not indicated in the Figure) through diplegs 8. After oxychlorination, said catalyst particles enter the calcination zone 11 through diplegs 10 for drying the catalyst (the oxygen-containing gas is not indicated in the Figure). The regenerated catalyst particles leave regenerator 2 through line 12. The recycled regeneration gas enters the radial catalyst bed from the bottom of the second coke-burning zone 7 through line 19 and comes into contact with the catalyst particles carrying a small amount of coke. Then, said regeneration gas enters the radial catalyst bed of the first coke-burning zone, and leaves regenerator 2 after contacting with the deactivated catalyst particles, and then enters the recovery system 14 through line 13. The dry gas enters the compressor 16 through line 15. The compressed gas after being heated by heater 18 is recycled to the bottom of the second coke-burning zone 7 through line 19.

The advantages of the present invention lie in that:

1. Because a relatively low inlet temperature of the regeneration gas is adopted in the first coke-burning zone and a relatively high inlet temperature of the regeneration gas is adopted in the second coke-burning zone, the bed temperature near the inner screen of the upper bed of the coke-burning zone is relatively low. This is beneficial to reducing the decreasing rate of the specific surface area of the catalyst and thus the service life of the catalyst is prolonged by over 20% as compared with the conventional dry regeneration processes. At the same time when the small amount of the coke deposited on the catalyst is burnt, the second coke-burning zone also functions in heating the catalyst and thereby allows the catalyst to enter the oxychlorination zone at a higher temperature.

2. Because the dry regeneration gas passes through the second coke-burning zone first and then passes through the first coke-burning zone, the great amount of steam generated in the first coke-burning zone is carried away by the regeneration gas from the regenerator without entering the second coke-burning zone. Thus, coke-burning in the second coke-burning zone is completed in an environment of low water content, thus preventing the regeneration gas with high water content from contacting the catalyst particles at a high temperature during coke-burning in the process of continuous regeneration of a catalyst. At the same time, it has also the effects on protecting the performance of the catalyst and prolonging its service life, as well as reducing the loss of the chlorine component. As a result, on the one hand, the consumption of chlorination agents for supplementing chlorine is reduced, and on the other hand, the corrosion of the regeneration gas to the regeneration system is alleviated.

3. The dechlorination and drying systems for regeneration gas provided in the regenerative loop reduce the requirement for the material quality of the lines and the apparatus. The adoption of a flow pattern of the regeneration gas in the coke-burning zone along the radial direction in a centrifugal manner helps improve the distribution of the regeneration gas and at the same time the pinning tendency of the catalyst in the radial bed is alleviated, thereby a relatively great flux of the regeneration gas is permitted and the coke-burning capacity of the regenerator is raised.

FIGS. 1–4 are the schematic flow diagrams of the first to fourth embodiments of the process provided by the present invention respectively, and FIG. 5 and FIG. 6 are the schematic flow diagrams of the process provided by the present invention when it is carried out in a regenerator comprising a first coke-burning zone with varied bed thickness. The reference signs in the drawings have the following meanings: 2 indicates the regenerator, wherein 4 indicates the first coke-burning zone, 7 indicates the second coke-burning zone, 9 indicates the oxychlorination zone, 11 indicates the calcination zone; 4a, 4b, 4c indicate the catalyst bed, the outer screen, and the inner screen of the first coke-burning zone respectively; 7a, 7b, 7c indicate the catalyst bed, the outer screen and the inner screen of the second coke-burning zone respectively; 3 indicates the diplegs; 5, 8, 10, indicate the diplegs; 14 indicates the recovery system; 16 indicates a compressor; 18 indicates a heater; 21 indicates a baffle; and 1, 6, 12, 13, 15, 17, 19 all indicate the pipe-lines.

EXAMPLE

The following examples will further describe the process provided by the present invention, but shall not be construed as limiting the invention.

Example 1

The performance of the catalyst is closely related to the variation of its specific surface area. In order to investigate the effect of the water content in the regeneration gas on the specific surface area of the catalyst, aging experiments were conducted on a spheroidal industrial catalyst 3961 (produced by the Catalyst Plant of No. 3 refinery, China National Petroleum-gas Corporation) in atmospheres of various water contents. The conditions under which the experiments were carried out were as follows: the gas phase was nitrogen; the temperature was 650° C.; the water contents in the gas phase were 100 ppmv, 3000 ppmv, 35000 ppmv respectively.

Figure 7:
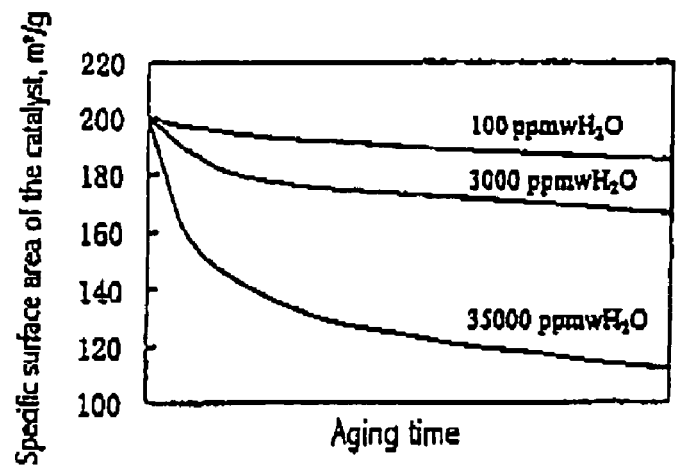
FIG. 7 is a diagram showing the variation in the specific surface area of the catalyst as a function of time.

The variation in the specific surface area of the catalyst as a function of time is shown in FIG. 7. It can be seen from FIG. 7 that the specific surface area of the catalyst reduced with extended time of treatment. When the water content in the gas phase was equal to that in the regeneration gas involved in the present invention, i.e., 100 ppmv, the decreasing rate of the specific surface area was very slow. But, when the water content in the gas phase was equal to that in the regeneration gas involved in the conventional process of dry regeneration, i.e., 3000 ppmv, the decreasing rate of the specific surface area increased. When the water content in the gas phase was equal to that in the regeneration gas involved in the conventional process of thermal regeneration, i.e., 35000 ppmv, the decreasing rate of the specific surface area obviously increased.

If the above experiment results are correlated with the catalyst life, it can be concluded that the process for regenerating catalyst particles provided by the present invention permits the service life of the catalyst to be prolonged by over 20% compared with the conventional process of dry regeneration and by 100% compared with the conventional process of thermal regeneration.

Example 2

The coke-burning zone in the regenerator according to the present invention is a radial bed. When the regeneration gas passes through the catalyst bed along the radial direction, the distribution of the regeneration gas along the axial position has some effect on the coke-burning efficiency in the regenerator. Therefore, experiments were conducted to study the relationship between the distribution of the gas along the axial position and the manner in which the gas enters the coke-burning zone.

The apparatus and conditions adopted in the cool model experiments were as follows: the diameter of the outer screen of the radial bed was 400 mm; the diameter of the inner screen was 130 mm; due height of the perforated zone of the bed was 1307 mm; the catalyst was a spheroidal γ-$Al_2O_3$ support without any active components thereon; the average diameter of said support was 1.8 mm; the gas used in the experiments was air at a flow rate of 200–800 m³/h.

Figure 8:
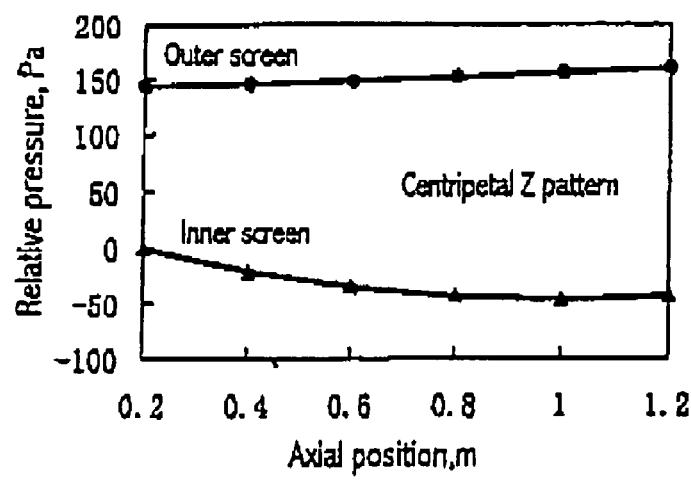
FIG. 8 is a diagram showing the static pressure of the regeneration gas in a flow pattern of a centripetal Z type near the inner screen and the outer screen as a function of the axial position.
Figure 9:
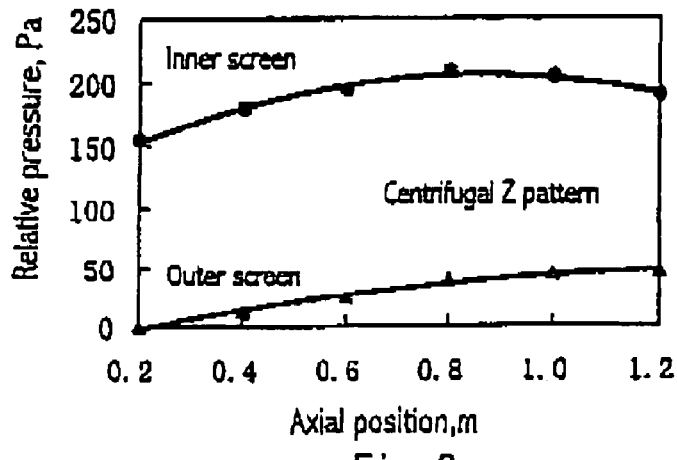
FIG. 9 is a diagram showing the static pressures of the regeneration gas in a flow pattern of a centrifugal Z near the inner screen and the outer screen as a function of the axial position.

The flow pattern of said gas is defined as the Z type, flowing in the manner of entering from the top and exiting from the bottom or vice versa; flowing from outside to inside along the radial direction is defined as the centripetal type, and flowing from inside to outside is defined as the centrifugal type. The two Z type flow patterns, namely the centripetal type and the centrifugal type, for the gas to flow in and out were investigated respectively; the gas flow rate used was 800 m³/h. The distribution profiles of the static pressure at the inner screen and the outer screen for the above two cases were obtained as shown in FIG. 8 and FIG. 9 respectively. The driving force for the gas to pass through the radial bed comes from the difference between the static pressures at the inner screen and the outer screen. If such differences are identical at different axial positions of the bed, the gas distribution is uniform along the axial direction. It can be seen from FIG. 8 and FIG. 9 that the difference between the static pressures at the inner screen and the outer screen in a centripetal Z type radial bed varies with different axial positions. The static pressure difference at the inlet is smaller, while that at the outlet is greater, consequently the driving force at the outlet for the gas passing through the bed is greater than that at the inlet, and the flux of the gas from the inlet to the outlet along the axial direction gradually increases. The difference between the static pressures at the inner screen and outer screen in a centrifugal Z type radial bed varies very little along with different axial positions so that the distribution of the gas is nearly uniform along the axial direction.

In the conventional dry regeneration process, the from-top-down centripetal Z type flow pattern of the regeneration gas is used in the coke-burning zone of the regenerator, thereby the gas distributed to the lower bed is more tan that distributed to the upper bed. But the content of the coke on the catalyst reduces successively from-top-down; that is to say, the catalyst in the upper bed contains more coke and needs more oxygen for coke-burning. Therefore, this type of flow pattern has certain drawbacks in view of the coke-burning. The from-bottom-up flow pattern of the regeneration gas is used in the coke-burning zone according to the present invention, so the gas distributed to the upper part of the bed is more than that distributed to the lower part when using a centripetal Z type flow pattern, which is beneficial to the enhancement of the coke-burning efficiency of the catalyst. For the centrifugal Z type flow pattern of the gas, the distribution of gas flux is relatively uniform along the axial direction and also has some advantages as compared with the from-top-down centripetal Z type flow pattern. In summary, no matter whether a centripetal or a centrifugal Z type flow pattern of the gas is adopted in the coke-burning zone of the regenerator according to the present invention, it is superior over the centripetal Z type radial bed of the conventional dry process.

What is claimed is:

1. A process of continuously regenerating catalyst particles comprising passing deactivated catalyst particles downwardly, in sequence, through a first coke-burning zone, said first coke-burning zone comprising a radial bed, an inner screen and an outer screen; a second coke-burning zone, said second coke-burning zone comprising a radial bed, an inner screen and an outer screen; an oxychlorination zone and a calcination zone, wherein said deactivated catalysts particles are contacted in said first coke-burning zone with regeneration gas from said second coke-burning zone, supplementary dry air and an inert gas; said regeneration gas being withdrawn from said first coke-burning zone and recycled back into said second coke-burning zone where it is contacted with said catalyst particles previously contacted in said first coke-burning zone, said regeneration gas having a water concentration of 10 to 200 ppmv.

2. The process according to claim 1 wherein said regeneration gas is dried after being withdrawn from said first coke-burning zone before being recycled into said second coke-burning zone.

3. The process according to claim 1 wherein the regeneration gas passes through a catalyst bed of the second coke-burning zone in a centrifugal or centripetal radial direction and then passes through a catalyst bed of the first coke-burning zone in a centrifugal or centripetal radial direction.

4. The process according to claim 1 wherein the regeneration gas passes through a catalyst bed of the second coke-burning zone in a centrifugal radial direction and then passes through a catalyst bed of the first coke-burning zone in a centrifugal radial direction.

5. The process according to claim 1 wherein the operating pressure of the regeneration process is in the range of 0.3–0.9 MPa.

6. The process according to claim 1 wherein the regeneration gas at the inlets of the first and second coke-burning zones has an oxygen concentration in the range of 0.2–1.0 v %.

7. The process according to claim 1 wherein the regeneration gas entering the first-coke burning zone is at a temperature in the range of 410–480° C.

8. The process according to claim 1 wherein the regeneration gas entering the second coke-burning zone is at a temperature in the range of 480–520° C.

9. A process of continuously regenerating catalyst particles comprising passing deactivated catalyst particles from moving bed reactors downwardly by gravity, in sequence, through a first coke-burning zone, said first coke-burning zone comprising a radial bed, an inner screen and an outer screen; a second coke-burning zone, said second coke-burning zone comprising a radial bed, an inner screen and an outer screen; an oxychlorination zone; and a calcination zone wherein a dry oxygen-containing gas at a temperature in the range of between 480° C. and 520° C. is introduced into the bottom of said second coke-burning zone; passing said gas through a catalyst bed of said second coke-burning zone in a centrifugal or centripetal radial direction wherein coke present on said catalyst particles is burned off; cooling said gas from said second coke-burning zone to a temperature in the range of 410° C. to 480° C. by adding dry air and a dry inert gas; introducing said gas, passed through said second coke-burning zone, into said first coke-burning zone; passing said gas through a catalyst bed of said first coke-burning zone in a centrifugal or centripetal radial direction wherein coke is burned off said catalyst particles; withdrawing said gas from said first coke-burning zone; mixing said withdrawn gas with outlet gas from said oxychlorination zone; drying said gas in a recovery system wherein said gas is dried; passing said dry gas through a compressor; heating said compressed dry gas to a temperature in a range of 480° C. to 520° C.; and recycling said heated compressed dry gas to said second coke-burning zone wherein said recycled gas enters said first and said second coke-burning zones having an oxygen concentration in a range of 0.2 to 1.0 v %; and wherein said recycled gas enters said second coke-burning zone having a water concentration of 10 to 200 ppmv, said process occurring at an operating pressure in the range of 0.3 MPa to 0.9 MPa.

10. The process according to claim 1 or 9 wherein said inner screen of the first coke-burning zone is a cylinder with a uniform diameter, or a tapered cylinder with a downwardly reduced diameter.

11. The process according to claim 10, wherein the diameter of said inner screen is linearly reduced from its top wherein its minimal diameter is 60–90% of its maximal diameter.

12. The process according to claim 10, wherein the diameter of said inner screen is reduced at a point 40–60% from the top of the height of the first coke-burning zone in a straight down manner so that the diameter at the bottom of said inner screen is 60–90% of the diameter at the top of said inner screen.

13. The process according to claim 1 or 9 wherein said inner screen of the second coke-burning zone is cylindrically shaped.

* * * * *